April 2, 1963
E. L. FENTON
3,083,746
FEED MILL
Filed Aug. 30, 1960
3 Sheets-Sheet 1
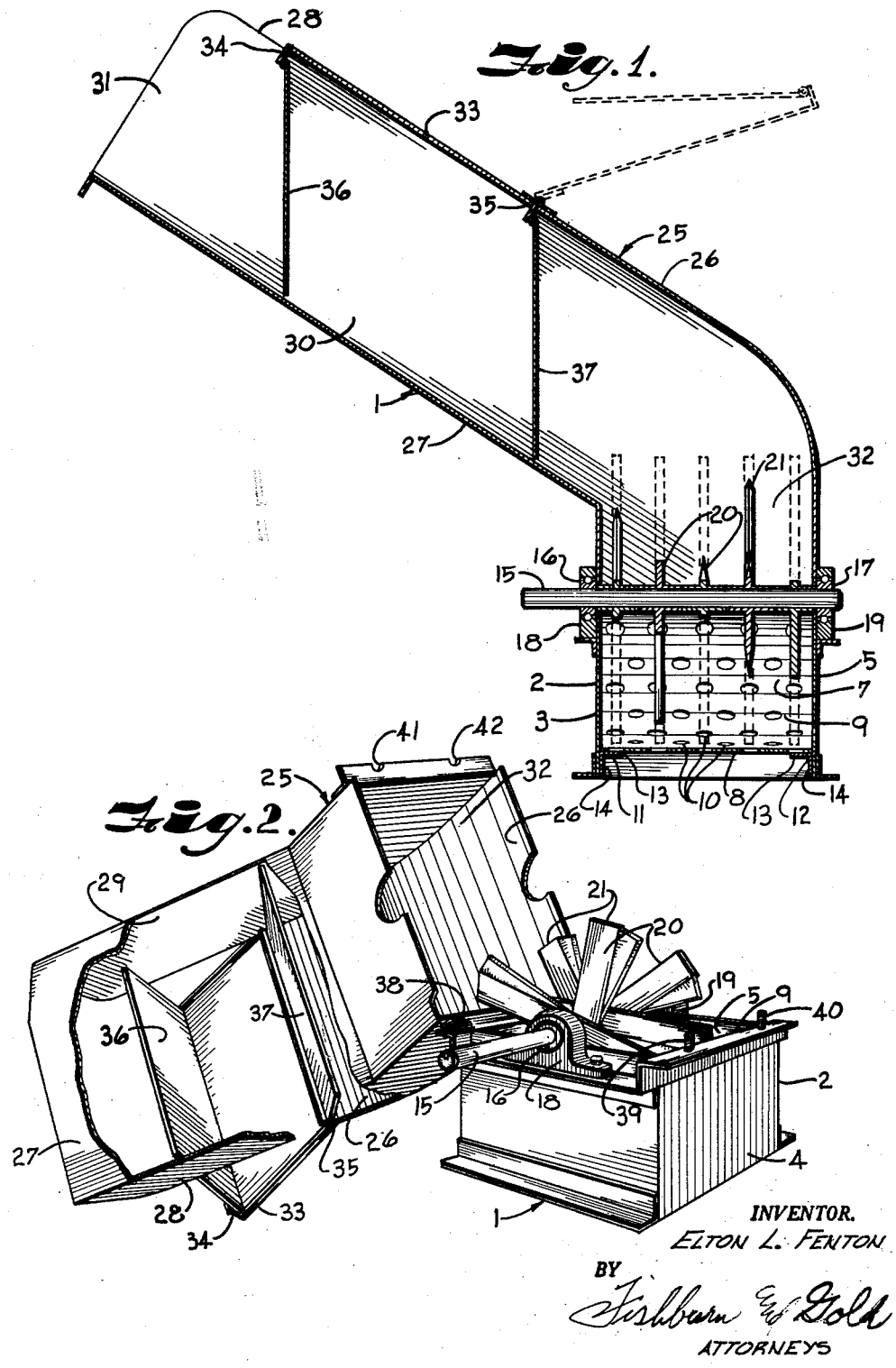
INVENTOR.
ELTON L. FENTON
BY
Fishburn & Gold
ATTORNEYS

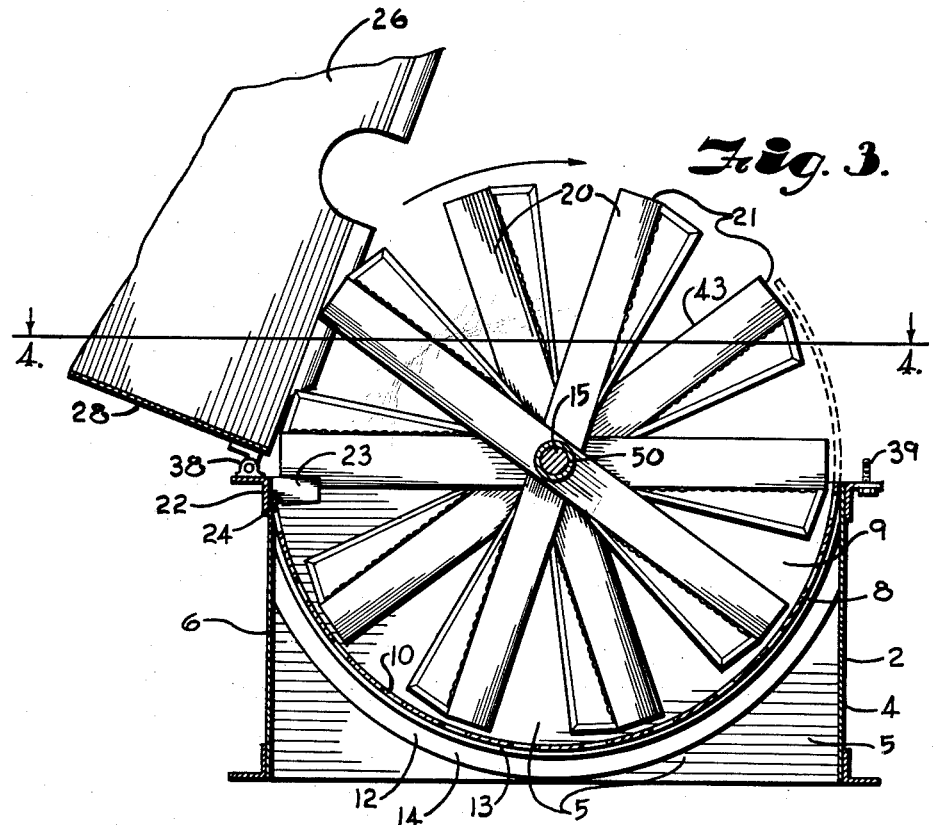
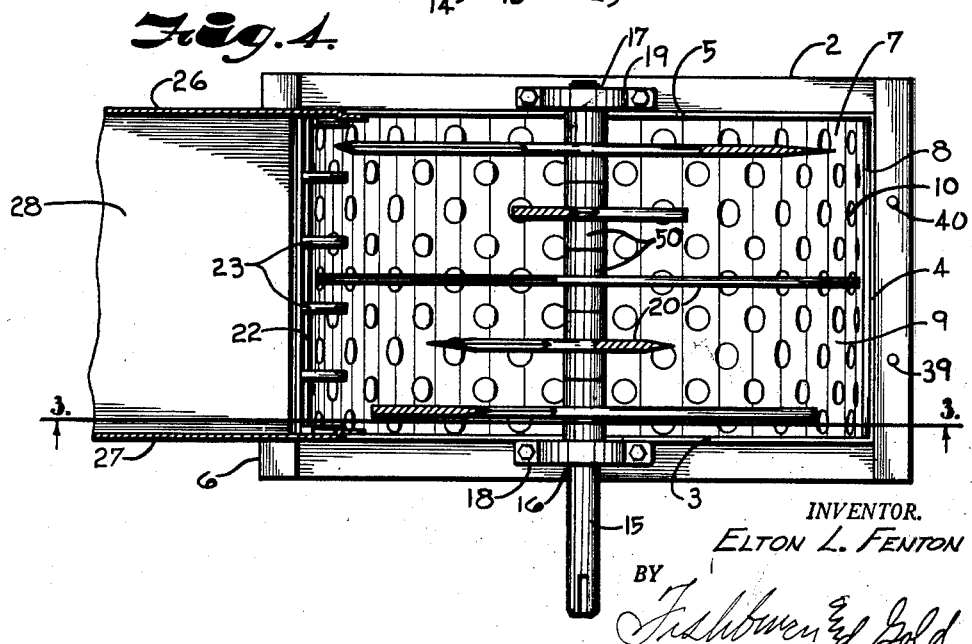

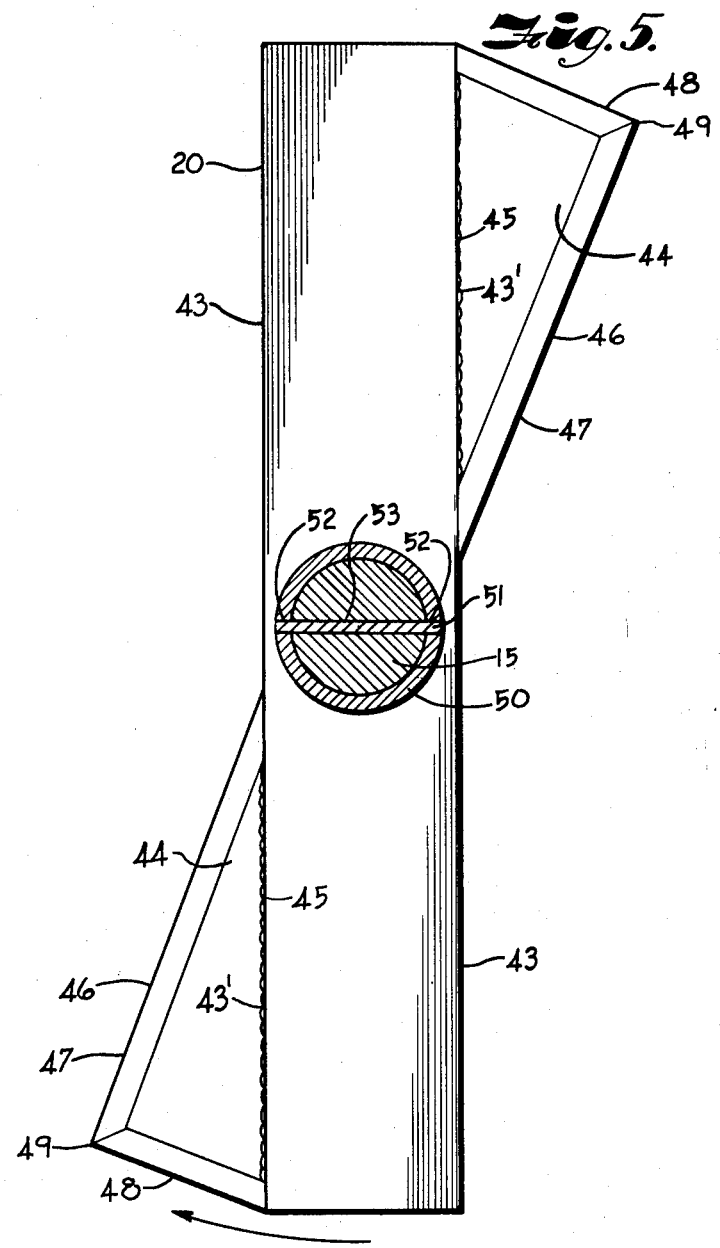

United States Patent Office 3,083,746
Patented Apr. 2, 1963

3,083,746
FEED MILL
Elton L. Fenton, R.R. 2, Bonner Springs, Kans.
Filed Aug. 30, 1960, Ser. No. 52,831
2 Claims. (Cl. 146—123)

This invention relates to feed mills, and more particularly to devices for the cutting or comminution of farm products such as feed and the like.

The principal objects of the present invention are: to provide a mill for feed products which requires significantly less power to operate than known devices of this type; to provide such a device having a unique feeding conduit structure which feeds products in a direction generally parallel to the blade shaft to increase turbulence and prevents products from being thrown from the comminuting chamber; to provide such a device having a section of the feed structure upper wall foldable or pivotable rearwardly when a large platform is required upon which to feed hay or the like; to provide such a device having laterally spaced rotating blades closely positioned to the walls of the cutting or comminuting chamber and feeding structure to reduce "dead space" in the cutting area; to provide such a device having fingers interposed between spaced cutting blades to prevent swirling and increase cutting efficiency while keeping the cutting blades clean; to provide an improved feed mill in which the feeding structure is hingedly secured to a wall of the cutting chamber to permit ready chamber access; to provide such a device in which the screen is easily rotatable in one direction about the blade shaft for removal thereof but is retained against rotation in the direction of blade travel; to provide a highly efficient cutting and chopping comminuting blade exhibiting a sharp leading edge of compound shape including radially spaced straight portions uniting in an angular relation to form a point aimed in the direction of blade rotation; to provide such a blade which produces a wedging action against the perforated screen; and to provide such a feed mill which is inexpensive to build and highly serviceable in use.

Other objects and advantages of this invention will become apparent from the following description taken in connection with the accompanying drawings wherein are set forth by way of illustration and example certain embodiments of this invention.

FIG. 1 is a cross sectional view in side elevation showing a feed mill and the feeding structure leading thereinto.

FIG. 2 is a perspective view showing the feeding structure pivoted with respect to the cutting chamber housing to expose the interior thereof.

FIG. 3 is a sectional view taken on the line 3—3 of FIG. 4, showing the position of the perforated screen with respect to the cutting and chopping blades.

FIG. 4 is an enlarged fragmentary cross sectional view taken on the line 4—4 of FIG. 3, showing the position of the transversely spaced fingers with respect to the blades.

FIG. 5 is an enlarged detail plan view of the improved cutting and chopping comminuting blade.

Referring more in detail to the drawings:

The reference numeral 1 generally indicates a milling or cutting apparatus constructed in accordance with this invention. The apparatus 1 is comprised of a housing 2 having spaced upright walls 3, 4, 5 and 6 which define a vertical passageway 7. The passageway 7 is obstructed by means of an arcuate screen 8 transversely positioned between the upright walls 3 to 6 inclusive, forming therewith a product-receiving cutting and chopping chamber, 9. The screen 8 is perforated with suitable openings 10 through which the products pass, the openings 10 determining the size of the comminuted products. Arcuate retaining members 11 and 12 are in the form of angles having one leg 13 extending inwardly of the housing 2 and the other leg 14 suitably secured to the walls 3 and 5, for example, by welding. A shaft 15 extends through the housing 2 and is rotatably supported thereon by means of bearings 16 and 17 retained in pillow blocks 18 and 19 respectively bolted to the walls 3 and 5. The shaft is driven by any suitable prime mover (not shown). A plurality of transversely spaced blades 20, described in more detail hereinafter, are radially mounted on the shaft 15 and adapted to rotate therewith. The arcuate retaining members 11 and 12 support the perforated screen 8 closely adjacent the path described by the ends 21 of the blades 20 during rotation thereof, the screen 8 being formed on an arc which closely follows said path. The screen 8 is rotatable counterclockwise about the shaft 15 (as seen in FIG. 3) by sliding upon the retaining members 11 and 12, thus permitting rapid removal thereof for changing screens or for apparatus maintenance.

The clockwise rotation of the screen 8 causes the inserted end 22 thereof to contact a plurality of horizontally extending transversely spaced fingers 23 secured to the wall 6. The fingers 23 have the underside root 24 thereof indented to receive the screen 8 and prevents its rotation clockwise (as seen in FIG. 3) which is the direction of blade rotation. The fingers 23 are transversely positioned between the paths described by the blades 20 and extend radially into the cylinder of revolution formed by the rotation of said blades.

An elongated feeding conduit structure 25 is comprised of a top wall 26, a bottom wall 27 and parallel side walls 28 and 29 which extend obliquely upwardly from the chamber 9 in a plane containing the axis of the shaft 15. The elongated structure 25 forms passageway 30 extending therethrough and terminating at the upper end of the structure 25 in an entrance portion 31. The lower end of the structure 25 curves downwardly to form an elbow portion 32 which permits the passageway 30 to communicate with the cutting and chopping chamber 9 for feeding products thereinto.

The walls 26 to 29 inclusive, in the vicinity of the elbow portion 32, are positioned in closely spaced relation to at least one of the blades 20, reducing "dead space" in the cutting and chopping area which increases comminuting efficiency.

The top wall 26 includes a rectangular forward section 33 having a forward edge 34 and a rearward edge 35. The rearward edge 35 extends transversely of the elongated structure 25 and is hingedly secured thereto permitting rearward pivotal movement of the forward section 33 with respect to the elongated structure 25. A vertically depending gate 36 is hingedly secured to the forward edge 34. The gate 36 is rectangular in shape and has dimensions substantially equal in width to the passageway 30 but greater thereto in height (FIG. 1). A second gate 37 is hingedly secured to the elongated structure 25 adjacent the rearward edge 35 of the forward section 33 and is also substantially equal in width to the passageway 30 but greater in height. The gates 36 and 37 form obstructions in the passageway 30 which are pivotable inwardly toward the blades 20 but jam against the bottom wall 27 if urged outwardly toward the entrance portion 31. The gate 36 is withdrawn upwardly and rearwardly of the passageway 30 when the forward section 33 is pivoted rearwardly about its rearward edge 35.

The elongated structure 25 is secured at the lower edge of the wall 28 to the housing 2 by means of hinges 38 which permit the elongated structure 25 to be pivoted with respect to the housing 2 providing access to the chamber 9 for removing and replacing the screen 8 or servicing parts otherwise enclosed in the housing 2 and elbow portion 32. Upstanding threaded securing studs 39 and 40 are fixed to the upper edge of the wall 4 and extend into receiving openings 41 and 42 in the lower edge of the side wall 29 when the elongated structure 25 is in operable relation with the housing 2.

The blades 20 are comprised of shank portions 43 and edge portions 44. The shank portions 43 are of elongated rectangular shape and the edge portions 44 are of triangular shape and secured to the shank portions 43 along the leading edge 43' thereof by means of welds 45. However, the shank portions 43 and edge portions 44 may be formed integrally, for example, by casting. The blades 20 exhibit a sharp leading edge 46 having a compound shape including a straight inner portion 47 and a straight outer portion 48. The outer portion 48 is spaced radially outwardly from the inner portion 47 and at an oblique angle with the screen 8 producing a wedging action thereagainst during blade rotation. The inner portion 47 and outer portion 48 unite intermediate the length of the edge 46 to form a point 49 aimed in the direction of blade rotation. The blades 20 are secured to collars 50 which provide rotationally staggered and laterally spaced support therefor upon the shaft 15. The blades 20 are prevented from rotational slippage with respect to the shaft 15 by means of shear pins 51 which are driven into suitable aligned receiving bores 52 and 53 in the collars 50 and shaft 15 respectively. The shear pins 51 are adapted to shear transversely thereof in case of blade overload, for example, caused by a piece of hard material such as metal in the chamber 9.

It has been found that the above-disclosed apparatus offers significant advantages over grinders or hammer mills presently used for feed processing. The unique blades 20, in combination with the closely spaced screen 8 and fingers 23, are found to operate with a cutting and chopping action which requires significantly less power than conventional equipment while producing comminuted material of desired size without the large quantity of dusty residue which often causes illness when fed to farm animals.

The material to be chopped or cut is fed from a direction generally parallel to the shaft 15 in order that the incoming material moves laterally across the blade tips. This has been found to greatly increase the mixing or turbulence of the material in the chamber for high cutting efficiency and decrease the tendency for the material to stratify in layers between the cutting blades. The feed mill comprising this invention has been found to readily receive and process a great variety of material, such as hay, corn cobs, roots stem, vegetables, ear corn, milo, maize, wheat, oats, barley, rye, etc. If light bulky material such as flakes of hay are being fed into the mill, it is desirable to have a large surface or platform for receiving same, and the forward section 33 may be folded or pivoted back to expose a large portion of the bottom wall 27. The gate 37 exhibits a wedging action which will keep the material in the machine in case the material is forced upwardly of the chamber 9 by the rotating blades. The gate 37 also prevents materials such as grain and ear corn from flying outwardly of the cutting chamber and leaving the apparatus. When a large feeding platform is not required, it is advantageous to keep both the gates 36 and 37 in the passageway obstructing position in order to reduce the production of dust outside the feed mill and to provide a double protection against materials flying from the apparatus since it is unlikely that both gates will be open at the same instant.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A feed mill comprising; a housing having a perforated screen with an arcuate inner surface, a cutting blade mounted for rotation in said housing in a direction about the axial center of said screen and extending substantially radially outwardly from said axial center, said blade terminating in an outer tip adjacent said screen, said blade comprising a shank portion and an edge portion, said edge portion having a sharp leading cutting edge, said cutting edge having a compound shape including a radially spaced outer portion and a radially spaced inner portion, said outer portion extending at an acute angle to a tangent line at said blade tip of the circle generated by said blade tip during said rotation, the apex of said acute angle pointing rearwardly of said direction of rotation, whereby a wedging aciton is produced between said outer portion and said inner surface for inducing material comminution by said outer portion during the rotation of said blade in said direction.

2. The feed mill as set forth in claim 1 wherein said outer portion and inner portion are straight and extend at an angle to each other and unite intermediate the radial length of said cutting blade to form a point aimed in said direction of rotation.

References Cited in the file of this patent
UNITED STATES PATENTS

| | | |
|---|---|---|
| 2,060,126 | Scheynost | Nov. 10, 1936 |
| 2,796,102 | Schmidt | June 18, 1957 |
| 2,864,421 | Schmidt | Dec. 16, 1958 |
| 2,873,921 | Christiansen | Feb. 17, 1959 |
| 2,892,478 | Gronberg | June 30, 1959 |
| 2,924,058 | Brooks | Feb. 9, 1960 |